Feb. 27, 1968   D. SCHIFF   3,370,354
GEOMETRICAL INSTRUMENT AND METHOD FOR FINDING ANY
FRACTION OF AN ANGLE
Filed April 26, 1965

*INVENTOR.*
DANIEL SCHIFF

BY WILFRED J. BARANICK
and
CHARLES S. MCGUIRE
ATTORNEYS

United States Patent Office

3,370,354
Patented Feb. 27, 1968

3,370,354
GEOMETRICAL INSTRUMENT AND METHOD FOR FINDING ANY FRACTION OF AN ANGLE
Daniel Schiff, 747 Pleasant St.,
Framingham, Mass. 01701
Filed Apr. 26, 1965, Ser. No. 450,618
8 Claims. (Cl. 33—1)

ABSTRACT OF THE DISCLOSURE

A method, and a geometrical instrument for carrying out such method, of dividing an angle into any desired number of fractional parts by means of a family of curves, each representing a given fraction into which the angle is divided by placing one leg thereof along the fixed X axis line and the other leg tangent to the curve.

---

This invention relates to an instrument and method for finding any desired fraction of a given trigonometric angle.

Numerous devices and methods have been devised with which a desired fractional part of an angle may be found; however, none of these devices or methods have been completely satisfactory. Many require the use of an instrument in conjunction with a succession of laborious and time-consuming geometrical computations and operations. Other devices are intolerably inaccurate. Certain other prior arrangements furnish the necessary accuracy but are unwieldy and cumbersome; many have moving parts requiring excessive space to operate. Still others are difficult to use.

It is therefore an object of this invention to provide a geometrical instrument for finding a predetermined fraction of a given angle which has an exceedingly facile and rapid one-step mode of operation.

It is another object of this invention to provide a geometrical instrument with which any desired fraction of a given angle may be accurately determined.

It is still another object of this invention to provide a compact, one-piece geometrical instrument for finding a fraction of a given angle which has no moving parts.

It is a further object of this invention to provide a method by which a fraction of a given angle can be easily, quickly, and accurately found.

Further objects and advantages of this invention will become apparent as the following description proceeds. The subject matter which constitutes this invention will be pointed out with particularity in the claims annexed to and forming a part of this invention.

Briefly, in one embodiment thereof, this invention comprises a transparent geometrical instrument having a family of curves marked thereon, one curve for each predetermined fractional part of an angle which it may be desired to find. The family of curves is defined by the equations:

$$x = -a \cot fT + y \cot T$$

and $$y = fa \frac{\sin^2 T}{\sin^2 fT}$$

For example, one curve may be used to find one-third of the given angle; another curve might be drawn to enable the user to determine a fractional part equal to one-fifth of the given angle. Associated with the family of curves is a point indicating, with respect to the vertex of the given angle, the desired fractional part of the given angle. A hole in the instrument at the designated point enables the user to mark the point. In operation, one leg of the given angle is aligned along the x axis of the family of curves. While maintaining this alignment, the instrument is then moved rectilinearly along the x axis until the other leg of the given angle forms a tangent with the curve for the desired fraction. The point associated with that curve is then marked through the hole in the instrument. This point indicates the desired angular fraction of the given angle.

It will be understood from the detailed discussion to follow that the method for finding a predetermined fraction of any given angle according to the teaching of this invention can be carried out independently of any geometrical instrument.

The more important features of this invention have thus been outlined rather broadly in order that the detailed description that follows may be better understood, and in order that the contribution to the art may be better appreciated. There are, of course, additional features of the invention that will be described hereinafter and which will also form the subject of the appended claims.

For a better understanding of the invention, reference may be had to the accompanying drawing in which.

Figure 1:
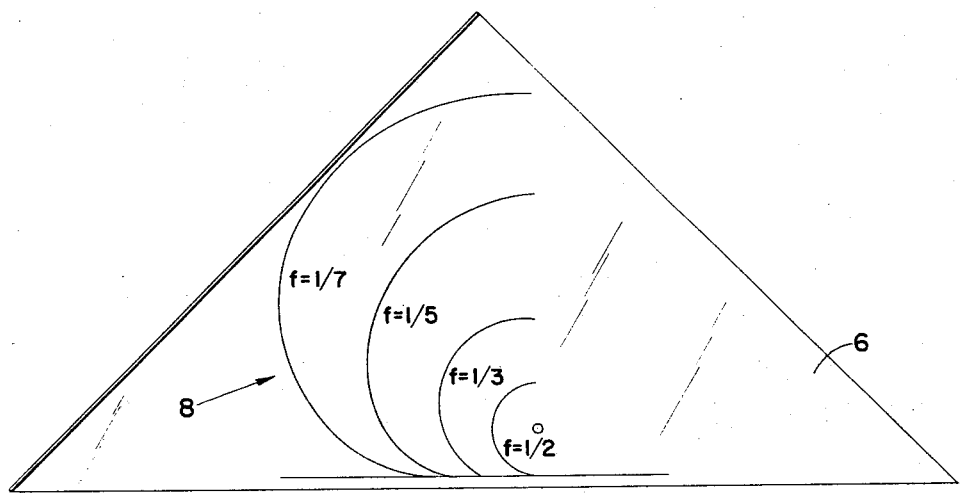
FIG. 1 illustrates a geometrical instrument embodying the invention.

This invention is most suitably adapted to be incorporated into a draftsman's instrument, for example, a triangle as illustrated in FIG. 1. The draftsman's triangle comprises a flat base 6 formed from a transparent sheet of material such as vinyl or acrylic plastic. These materials have the desired rigidity, stability and hardness.

In the preferred form of the invention a family of curves 8 is inscribed or otherwise marked on the base 6. The curves are the primary means by which a fraction of any given angle may be determined according to this invention.

The family of curves 8 is defined by the equations:

$$x = -a \cot fT + y \cot T$$

$$y = fa \frac{\sin^2 T}{\sin^2 fT}$$

Figure 2:
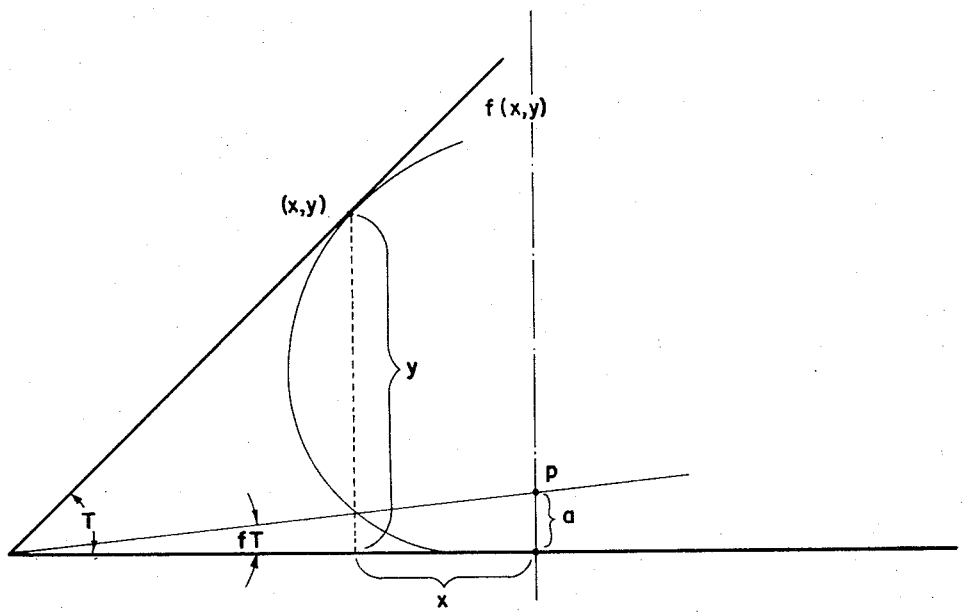
FIG. 2 is a trigonometric figure useful in understanding the derivation of equations defining the family of curves of the invention.

The derivation of these equations will be understood by reference to FIGURE 2. In FIGURE 2 the given angle to be operated on is T. In FIGURE 2 angle T is illustrated as being acute; however, the same equations will result from the derivation when angle T is obtuse. Referring to FIGURE 2, and assuming tangency at point $(x, y)$, it is evident from trigonometric principles that $$x = -a \cot fT + y \cot T \quad (1)$$

Differentiating (1) yields:

$$dx = \left( dT \frac{\partial x}{\partial T}(y = \text{const.}) + dy \frac{\partial x}{\partial y}(T = \text{const.}) \right)$$

$$dx = (fa \csc^2 fT - y \csc^2 T) \cdot dT + \cot T \cdot dy \quad (3)$$

$$\text{Tan } T = \frac{dy}{dx}$$

Therefore, $$dx = \cot T \cdot dy \quad (4)$$

Substituting (4) into (3), $$(fa \csc^2 fT - y \csc^2 T) = 0$$

Solving for $y$, $$y = fa \frac{\sin^2 T}{\sin^2 fT} \quad (5)$$

Equations 5 and 1 define the family of curves 8.

The family of curves 8 may be defined also in terms of $x$ and angle T. If (5) is substituted into (1), $$x = -a \cot fT + fa \frac{\sin T \cos T}{\sin^2 fT} \quad (6)$$

In the above Equations 5 and 1 or 6, $f$ is the parameter of the family of curves. Curves may be drawn for any values of $f$ from 0 to 1. For example, curves for values of $f$ of one-third, one-fifth and one-seventh are very useful to a draftsman.

As illustrated in FIGURE 1, a curve having a value of $f$ of one-half is a circle having its origin at $x=0$ and $y=a$.

The family of curves 8 alone is insufficient to find a predetermined fractional part of a given angle T. The location of point P is necessary. Viewing FIGURE 2, it is evident that the coordinates of point P are $$y = a$$

and $$x = 0$$

Broadly, to find a predetermined fraction of any given angle using this invention it is necessary merely to locate the given angle T adjacent a curve drawn according to the above-derived equations and having a value of $f$ equal to the desired predetermined fraction. If the given angle T is oriented with one leg along the $x$ axis of the curve and the other leg tangent to the curve, point P, with respect to the vertex of given angle T, will indicate the predetermined fraction $f$ of the given angle T.

As stated above, the invention is preferably used in conjunction with a geometrical instrument such as a drafting triangle (FIGURE 1). In this embodiment, a selected predetermined fractional part of a given angle can be found merely by placing the instrument upon the given angle with one leg of the angle along the $x$ axis of the family of curves 8 and the other leg tangent to the curve having the selected value of the fraction $f$. The $x$ axis may be printed or inscribed upon the base of the drafting instrument, as shown in FIG. 1, or may of course comprise one edge of the instrument, if desired, in either case defining the $x$-axis in the sense of representing it physically so that a draftsman can ascertain directly its alignment with one leg of the angle to be subdivided. The draftsman then marks point P, as through a hole in the instrument at that point. Point P with respect to the vertex of the given angle then indicates the desired fraction F of the given angle.

It is understood that $a$ may be a constant for the family of curves, or may be a constant only for each curve, with different values of $a$ being associated with various curves in the family. With a plurality of values of $a$, it is manifest that the location of point P for each curve is dependent upon the value of $a$ used in determining that particular curve. If it is desired to have a different value of $a$ for each curve comprising the family of curves, then, there will be a separate point P for each curve. It follows from the above discussion that $a$, as well as $f$, can be a parameter for the family of curves.

It should be noted that, whereas in FIGURES 1 and 2 and in the above description and explanation the given angle T has been illustrated as an acute angle, the invention is equally capable of finding a predetermined fraction of a given angle of any size.

This invention is not limited to the particular details of the embodiments illustrated and/or described and it is contemplated that various other modifications and applications will occur to those skilled in the art. For example, from the above principles it follows that a curve or family of curves may be prepared which are the reverse, or negative, of the curves illustrated. It is therefore intended that the appended claims shall cover such modifications and applications as to not depart from the true scope of this invention.

Although the family of curves has been described as being located on a triangular base, it should be understood that this invention contemplates embodiments other than those wherein the family of curves is inscribed or otherwise marked directly as a triangular base. For example, a useful embodiment might be constructed having a curve or curves constituting an edge or edges of the base. It is equally evident that another embodiment might have the point P located on an edge of or a projection from the base.

What is claimed is:

1. A geometrical instrument for finding a predetermined fraction of any given angle, comprising:
    (a) a base;
    (b) a curve on said base defined by the equations:

$$x = y \cot T - a \cot fT$$

and $$y = fa \frac{\sin^2 T}{\sin^2 fT}$$

where T is the angle formed between the $x$ axis and a line tangent to said curve at $(x, y)$, $a$ is a constant, and $f$ is the predetermined fraction;
    (c) means defining said $x$ axis on said base; and
    (d) a designated point on said base having the coordinates:

$$y = a$$

and $$x = 0$$

2. An instrument according to claim 1 wherein said curve is inscribed on a portion of said base intermediate the edges thereof.

3. A geometrical instrument for finding a predetermined fraction of any given angle, comprising:
    (a) a base;
    (b) a family of curves on said base, each curve being defined by the equations:

$$x = y \cot T - a \cot fT$$

and $$y = fa \frac{\sin^2 T}{\sin^2 fT}$$

where T is the angle formed between the $x$ axis and a tangent to said curve at $(x, y)$, $a$ is a constant for all curves, and $f$ is a predetermined fraction and the parameter of said family of curves;
    (c) means defining said $x$ axis on said base; and
    (d) a designated point on said base associated with said family of curves, said point having the coordinates:

$$y = a$$

and $$x = 0$$

4. A geometrical instrument for finding a predetermined fraction of any given angle, comprising:
    (a) a base;
    (b) a family of curves on said base, each curve being defined by the equations:

$$x = y \cot T - a \cot fT$$

and $$y = fa \frac{\sin^2 T}{\sin^2 fT}$$

where T is the angle formed between the $x$ axis and a tangent to said curve at $(x, y)$, $a$ is a constant for each curve, but at least one curve of said family of curves having a value of $a$ different from the values of $a$ of the remaining curves, and $f$ is a predetermined fraction and the parameter of said family of curves;
    (c) means defining said $x$ axis on said base; and
    (d) at least two designated points on said base associated with said family of curves, said points having the coordinates:

$$y = a$$
and
$$x = 0$$

5. The instrument defined in claim 4 wherein said family of curves includes curves for values of $f$ of one-third, one-fifth, and one-seventh.

6. A geometrical instrument for finding a predetermined fraction of any given angle, comprising:
  (a) a flat, transparent, triangularly shaped base;
  (b) a family of curves marked on said base, each curve being defined by the equations:

$$x = y \cot T - a \cot fT$$
and
$$y = fa \frac{\sin^2 T}{\sin^2 fT}$$

where $T$ is the angle formed between the $x$ axis and a tangent to said curve at $(x, y)$, $a$ is a constant for each curve, but at least one curve of said family of curves having a value of $a$ different from the values of $a$ of the remaining curves, and $f$ is a predetermined fraction and the parameter of said family of curves, said family of curves including curves for values of $f$ of one-third, one-fifth, and one-seventh;
  (c) means defining said $x$ axis on said base; and
  (d) at least two holes in said base associated with said family of curves, said holes having the coordinates:

$$y = a$$
and
$$x = 0$$

7. The method for finding a fraction of any given angle, comprising the steps of:
  (a) locating the given angle adjacent a curve defined by the equations:

$$x = y \cot - a \cot fT$$
and
$$y = fa \frac{\sin^2 T}{\sin^2 fT}$$

where $T$ is the angle formed between the $x$ axis and a line tangent to said curve at $(x, y)$, $a$ is a constant, and $f$ is the fraction, the given angle being oriented with one leg along the $x$ axis of said curve and the other leg tangent to said curve; and
  (b) locating a point at $y = a$ and $x = 0$, said point, with respect to the vertex of the given angle, indicating the predetermined fraction of the given angle.

8. An instrument according to claim 1 wherein said $x$ axis is defined by a line on an interior portion of said base.

References Cited

UNITED STATES PATENTS

| | | | |
|---|---|---|---|
| 772,283 | 10/1904 | Llona | 33—1 |
| 1,294,935 | 2/1919 | Milliken | 33—1 |
| 3,046,660 | 7/1962 | Fuess | 33—1 |

FOREIGN PATENTS 455,143   5/1913   France.

ROBERT B. HULL, *Primary Examiner.*